(12) United States Patent
Martin

(10) Patent No.: US 7,463,257 B2
(45) Date of Patent: Dec. 9, 2008

(54) PARALLAX SCANNING THROUGH SCENE OBJECT POSITION MANIPULATION

(75) Inventor: Michael Burgess Martin, Germantown, MD (US)

(73) Assignee: Vision III Imaging, Inc., Vienna, VA (US)

( * ) Notice: Subject to any disclaimer, the term of this patent is extended or adjusted under 35 U.S.C. 154(b) by 134 days.

(21) Appl. No.: 10/536,447

(22) PCT Filed: Nov. 26, 2003

(86) PCT No.: PCT/US03/35980

§ 371 (c)(1),
(2), (4) Date: May 26, 2005

(87) PCT Pub. No.: WO2004/051577

PCT Pub. Date: Jun. 17, 2004

(65) Prior Publication Data

US 2005/0270284 A1    Dec. 8, 2005

Related U.S. Application Data

(60) Provisional application No. 60/429,358, filed on Nov. 27, 2002.

(51) Int. Cl.
*G06T 15/00* (2006.01)
(52) U.S. Cl. ..................... 345/419; 382/154
(58) Field of Classification Search ............ None
See application file for complete search history.

(56) References Cited

U.S. PATENT DOCUMENTS

| | | | | |
|---|---|---|---|---|
| 5,014,126 | A | * | 5/1991 | Pritchard et al. ............ 348/42 |
| 6,005,607 | A | * | 12/1999 | Uomori et al. .............. 348/42 |
| 6,324,347 | B1 | * | 11/2001 | Bacs et al. ................. 396/429 |
| 2001/0045979 | A1 | | 11/2001 | Matsumoto et al. |
| 2004/0001062 | A1 | * | 1/2004 | Pharr ....................... 345/426 |

FOREIGN PATENT DOCUMENTS

EP    1 089 573 A2    4/2001

OTHER PUBLICATIONS

Martin, G., Smeyene, A., Moore, J., Lang, S., Dodgson, N., Three-dimensional visualization without glasses: a large-screen autostereoscopic display, Apr. 2000, Proceedings of SPIE, vol. 4022, pp. 1-11.*

* cited by examiner

*Primary Examiner*—Ulka Chauhan
*Assistant Examiner*—Said Broome
(74) *Attorney, Agent, or Firm*—Finnegan, Henderson, Farabow, Garrett & Dunner, LLP

(57) ABSTRACT

One aspect of the invention includes and method of generating virtual autostereoscopic images using a computer. The method may include defining at least one object in a virtual three-dimensional space and defining a virtual point of view. Images may be generated by simulating a parallax scanning motion of the at least one object. The generated images and be displayed and stored.

30 Claims, 3 Drawing Sheets

PARALLAX SCANNING THROUGH SCENE OBJECT POSITION MANIPULATION

This application claims the benefit of U.S. Provisional Application No. 60/429,358, filed Nov. 27, 2002, which is incorporated herein by reference.

FIELD OF THE INVENTION

The present invention relates to the visual arts field and more particularly to a system and method for using parallax scanning to generate and display autostereoscopic 3D computer graphics images.

BACKGROUND

The production of two-dimensional images that can be displayed to provide a three-dimensional illusion has been a long-standing goal in the visual arts field. Methods and apparatus for producing such three-dimensional illusions have to some extent paralleled the increased understanding of the physiology of human depth perception, as well as, developments in image manipulation through analog/digital signal processing and computer imaging software.

Binocular (i.e., stereo) vision requires two eyes that look in the same direction, with overlapping visual fields. Each eye views a scene from a slightly different angle and focuses it onto the retina, a concave surface at the back of the eye lined with nerve cells, or neurons. The two-dimensional retinal images from each eye are transmitted along the optic nerves to the brain's visual cortex, where they are combined, in a process known as stereopsis, to form a perceived three-dimensional model of the scene.

Perception of three-dimensional space depends on various kinds of information in the scene being viewed including monocular cues and binocular cues, for example. Monocular cues include elements such as relative size, linear perspective, interposition, light, and shadow. Binocular cues include retinal disparity, accommodation, convergence, and learned cues (e.g., familiarity with the subject matter). While all these factors may contribute to creating a perception of three-dimensional space in a scene, retinal disparity may provide one of the most important sources of information for creating the three-dimensional perception. Particularly, retinal disparity results in parallax information (i.e., an apparent change in the position, direction of motion, or other visual characteristics of an object caused by different observational positions) being supplied to the brain. Because each eye has a different observational position, each eye can provide a slightly different view of the same scene. The differences between the views represents parallax information that the brain can use to perceive three dimensional aspects of a scene.

A distinction exists between monocular depth cues and parallax information in the visual information received. Both eyes provide essentially the same monocular depth cues, but each provides different parallax depth information, a difference that is essential for producing a true three-dimensional view.

Depth information may be perceived, to a certain extent, in a two-dimensional image. For example, monocular depth may be perceived when viewing a still photograph, a painting, standard television and movies, or when looking at a scene with one eye closed. Monocular depth is perceived without the benefit of binocular parallax depth information. Such depth relations are interpreted by the brain from monocular depth cues such as relative size, overlapping, perspective, and shading. To interpret monocular depth information from a two-dimensional image (i.e., using monocular cues to indicate a three-dimensional space on a two-dimensional plane), the viewer is actually reading depth information into the image through a process learned in childhood.

True three dimensional images may differ from computer generated images commonly referred to as 3D or three-dimensional. Specifically, the term three-dimensional (3-D) has been expanded over the past several years by the computer-imaging industry to include images produced using depth cues that take advantage of perspective, shading, reflections, and motion. Although these images can be rendered with incredible results, they are nevertheless two-dimensional because they lack the parallax depth information found in true three dimensional images.

Several systems and methods exist for creating and/or displaying true three dimensional images. These methods may be divided into two main categories: stereoscopic display methods and autostereoscopic display methods. Stereoscopic techniques including stereoscopes, polarization, anaglyphic, Pulfrich, and shuttering technologies require the viewer to wear a special viewing apparatus such as glasses, for example. Autostereoscopic techniques such as holography, lenticular screens, and parallax barriers produce images with a three-dimensional illusion without the use of special glasses, but these methods generally require the use of a special screen.

Certain other systems and methods may use parallax scanning information to create autostereoscopic displays that allow a viewer to perceive an image as three-dimensional even when viewed on a conventional display. For example, at least one method has been proposed in which a single camera records images while undergoing parallax scanning motion. Thus, the optical axis of a single camera may be made to move in a repetitive pattern that causes the camera optical axis to be offset from a nominal stationary axis. This offset produces parallax information. The motion of the camera optical axis is referred to as parallax scanning motion. As the motion repeats over the pattern, the motion becomes oscillatory. At any particular instant, the motion may be described in terms of a parallax scan angle.

To generate an autostereoscopic display based on the parallax information, images captured during the scanning motion may be sequentially displayed. These images may be displayed at a view cycle rate of, for example, about 3 Hz to about 6 Hz. This frequency represents the rate at which the parallax image views in the sequence are changed. The displayed sequences of parallax images may provide an autostereoscopic display that conveys three-dimensional information to a viewer.

Parallax information may also be incorporated into computer generated images. For example, U.S. Pat. No. 6,324,347 ("the '347 patent"), which is incorporated herein by reference, discloses a method for computer generating parallax images using a virtual camera having a virtual lens. The parallax images may be generated by simulating a desired parallax scanning pattern of the lens aperture, and a ray tracing algorithm, for example, may be used to produce the images. The images may be stored in computer memory on a frame-by-frame basis. The images may be retrieved from memory for display on a computer monitor, recorded on video tape for display on a TV screen, and/or recorded on film for projection on a screen.

Thus, in the method of the '347 patent, the point of view of a camera (e.g., the lens aperture) is moved to produce the parallax scanning information. The ray tracing method of image generation, as may be used by one embodiment of the method of the '347 patent, may be used to generate highquality computer images, such as those used in movie special effects. Using this ray-tracing method to simulate optical effects such as depth of field variations, however, may require large amounts of computation and can place a heavy burden on processing resources. Therefore, such a ray tracing method may be impractical for certain applications, such as 3D computer games, animation, and other graphics applications, which require quick response.

Creating parallax image information by simulating the motion of a virtual lens may, in certain situations, create instability in the displayed parallax images. FIGS. 1A and 1B illustrate one embodiment of the method used in the '347 patent to generate parallax information. FIG. 1A illustrates a condition where three objects, A, B, and C, reside on an optical axis 20 of camera 11. The method of the '347 patent involves moving the point of view of camera 11 (e.g., the lens position) to generate parallax information. For example, as shown in FIG. 1B, camera 11 has been moved with respect to its original position in Fig. A. As a result, objects in front of and behind a convergence point 12 located on convergence plane 10 will appear to move with respect to the optical axis 20. Specifically, object A in front of convergence point 12 will appear to move in one direction, and object C will appear to move with respect to optical axis 20 in a direction opposite from the direction of motion of object A.

In the method of the '347 patent in which the point of view is moved, the amount that objects A and C appear to move linearly depends on their respective distances from the lens. As illustrated in FIG. 2A, objects located beyond convergence point 12 will receive a linearly increasing amount of parallax offset as the distance from the point of view increases. This property, however, may cause instability in the displayed parallax images. Specifically, in the displayed parallax images, objects far from the point of view will appear to move by large distances compared to objects closer to the point of view. Because objects far from the point of view contribute less depth information than objects closer to the point of view, the motion of distant objects is less important and may even cause image instability (e.g., a jitter effect caused by the motion of objects between successive parallax image frames). Using the method of the '347 patent (i.e., moving a virtual point of view to generate parallax information), under certain circumstances, direct control of object stability at depth extremes may be impractical.

The present invention is directed to overcoming one or more of the problems associated with the prior art.

SUMMARY OF THE INVENTION

One aspect of the invention includes a method of generating virtual autostereoscopic images using a computer. The method may include defining at least one object in a virtual three-dimensional space and defining a virtual point of view. Images may be generated by simulating a parallax scanning motion of the at least one object. The generated images can be displayed and stored.

Another aspect of the invention includes a method of generating an image. The method may include automatically monitoring at least one scene parameter associated with a scene to be imaged, determining a parallax scanning parameter based on the at least one scene parameter, applying the parallax scanning parameter to at least one object in the scene, and generating an image including the at least one object.

DETAILED DESCRIPTION OF THE INVENTION

The present invention includes a system and method for using parallax scanning to generate and display autostereoscopic 3D computer graphics images. That is, by incorporating parallax information into computer graphics images, these images may be perceived as having three dimensional characteristics. The invention improves on the prior art methods in at least two ways. First, automatic scan control algorithms calculate the proper parallax scan parameters based on the 3D virtual scene information. Second, instead of applying parallax scanning to a 3D virtual scene by moving a camera and holding scene geometry fixed, the method of the present invention applies parallax scanning to the scene by holding the camera fixed and moving the scene objects.

Previous parallax scanning methods as applied to computer imaging incorporated parallax information into scene images by moving the iris of the camera with respect to the scene objects being imaged. The present invention reverses this procedure by applying a parallax offset to the scene objects while holding the camera fixed at its normal position. This method may allow for greater control of the parallax scanning process by providing a means to alter the amount of parallax each object receives. While certain prior art methods may have moved all objects by an amount proportional to their distance from the convergence point, the method of the present invention allows for potentially arbitrary distance-to-offset mappings. Such mappings may allow for diminished proportional offset for very far and very near objects, thereby minimizing or preventing a case of having extreme near or far objects showing undesirable instability in the generated and/or recorded images.

The method of the present invention may also provide results more closely approximating the nonlinear behavior of a moving optical element (MOE) lens. Approximating a MOE lens may be useful, for example, when compositing computer-generated images with live action images where both types of images contain parallax scanning.

Figure 1A:
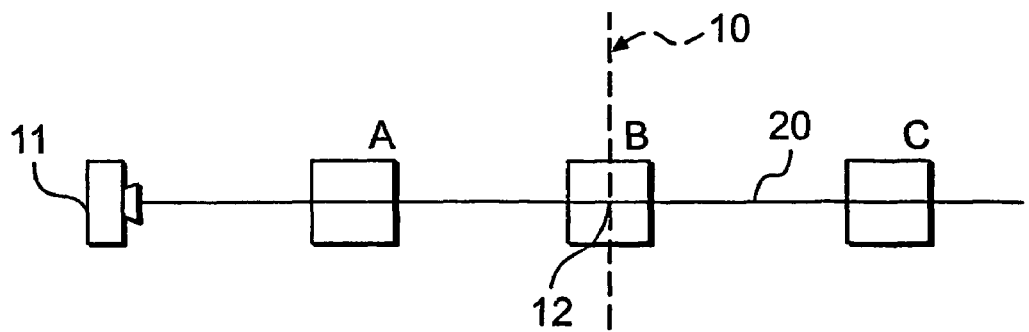
FIG. 1A provides a schematic representation of a scene having no parallax offset.
Figure 1B:
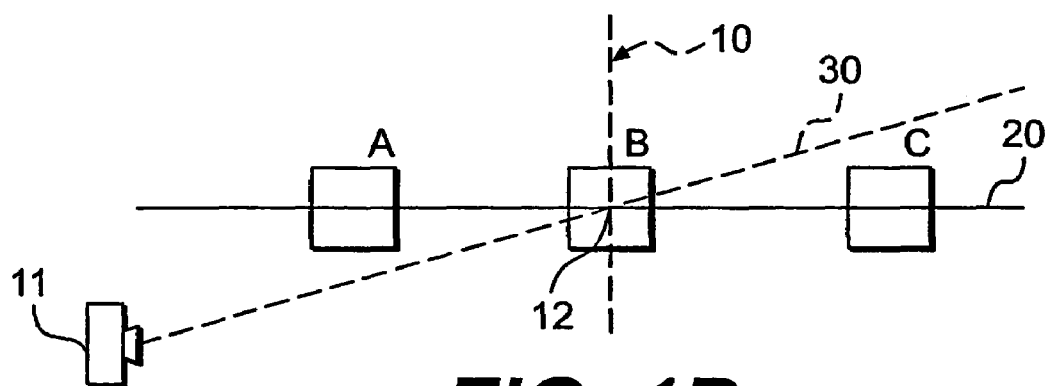
FIG. 1B provides a schematic illustration of a prior art method for generating parallax offset information in an image.
Figure 1C:
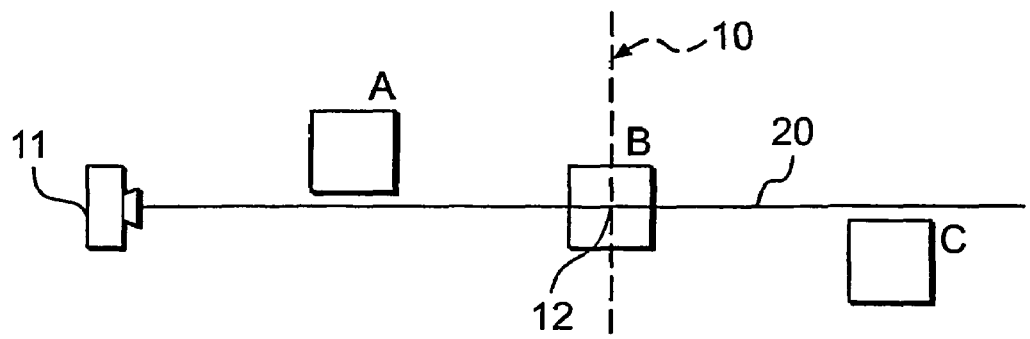
FIG. 1C provides a schematic illustration of a method for generating parallax offset information in accordance with an exemplary embodiment of the invention.

The effect of moving scene objects according to the present invention is illustrated, for example, in FIG. 1C. As shown, rather than changing the position of camera 11, as may be done in the prior art method shown in FIG. 1B, the position of camera 11 remains fixed. Instead, the positions of objects A, B, and C are adjusted based on their respective distances from the convergence plane 10. For example, in the virtual scene including objects A, B, and C, a computer may determine that object A resides between camera 11 and convergence plane 10. The computer may then offset the position of object A with respect to optical axis 20 in a first direction. Similarly, the computer may determine that object C is located at a distance farther from the point of view than convergence plane 10. Object C, therefore, will be moved in a direction opposite to the direction in which object A was moved. The position of object B remains fixed because object B is centered on convergence plane 10. It should be noted that each object in the scene may be moved, by a parallax offset amount, for example, in any direction on an x-y plane on which the object resides. Further, a certain amount of rotation may be applied to each object in the scene, if desired.

An inspection of FIGS. 1B and 1C reveals that the same parallax scanning information may be generated by either moving the position of camera 11 (FIG. 1B) or by moving the position of objects A, B, and C (FIG. 1C). Specifically, in response to the camera motion shown in FIG. 1B, object A appears to move upward (i.e., toward the top of FIG. 1B in the reference frame of the paper) with respect to optical axis 20, object B remains fixed, and object C appears to move downward with respect to optical axis 20. Despite keeping camera 11 at a fixed location in Fig. C, the same relative motions may be simulated. In Fig. C, object A appears to move upward with respect to optical axis 20, object B remains fixed, and object C appears to move downward with respect to optical axis 20.

In one embodiment of the prior art method illustrated in FIG. 1B, the amount of parallax offset applied to each object may be provided by a linear function dependent on the object's position with respect to the convergence plane. As noted above, this approach can lead to instability in the autostereoscopic display of a sequence of parallax images. In certain embodiments of the prior art method, which rely upon rotation to offset object positions, an object's position could not deviate from the position prescribed by the linear function relating the object's distance from the convergence plane to the amount of applied parallax offset.

In the method of the present invention, the amount of offset applied to each object may be controlled. Because the parallax images are generated by moving the objects in the scene rather than the point of view, the amount of movement applied to each object may be fully adjustable. Based on this characteristic, the amount of movement applied to an object is not confined to a value satisfying a linear function. Rather, any desired amount of movement may be applied to the objects. This feature may be especially useful to minimize or prevent undesirable motion of objects far from the point of view. Specifically, the amount of motion applied to an object in a scene may follow a non-linear distance-mapping curve such that decreasing amounts of parallax offset are applied to objects farther than a threshold distance from the convergence plane.

Figure 2A:
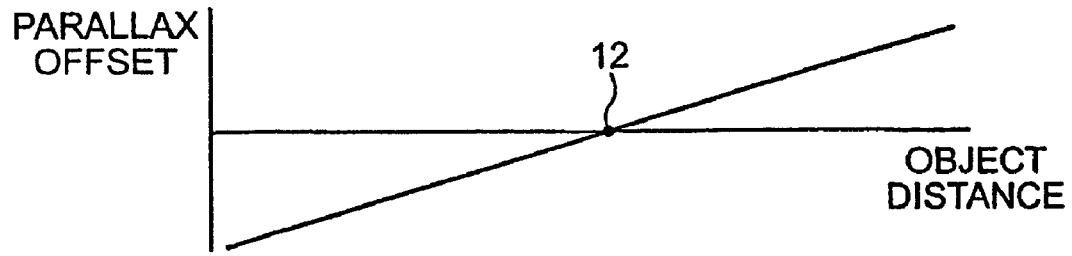
FIGS. 2A-2C represent various parallax offset versus distance profiles that may be employed by exemplary methods of the present invention.
Figure 2B:
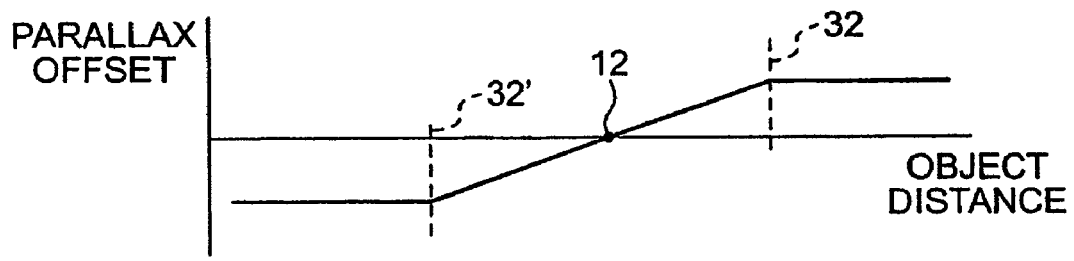
Figure 2C:
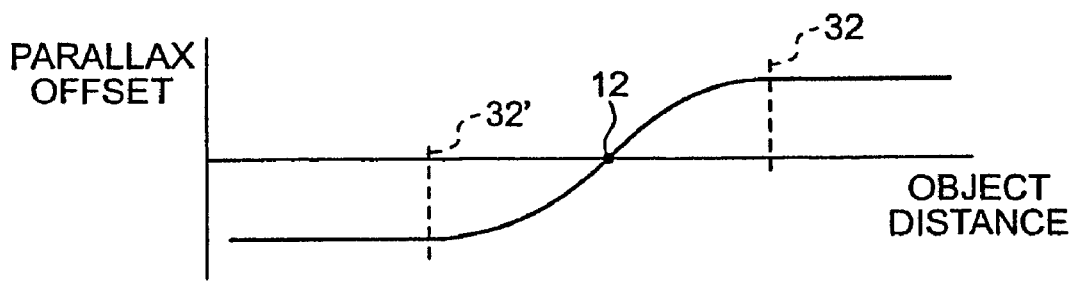

FIGS. 2A-2C illustrate several distance-mapping curves that may used in conjunction with the methods of the present invention. FIG. 2A illustrates a linear distance-mapping curve. While the present invention may apply parallax offset values to objects in a scene according to the linear distance-mapping curve of FIG. 2A, this curve may, in certain circumstances, introduce instabilities into the autostereoscopic display. For example, the linear distance-mapping curve may result in too much parallax offset being applied to distant objects in a scene.

FIG. 2B illustrates a non-linear distance-mapping curve that may be used in applications consistent with the present invention. As illustrated, the amount of parallax offset applied to an object in a scene will be zero at convergence point 12 and will increase linearly until a certain threshold distance 32. Beyond the threshold distance, the amount of applied parallax offset may remain constant. Threshold distance 32 may be any arbitrarily chosen distance. A second threshold distance 32' may be implemented for distances nearer to the point of view than convergence point 12.

FIG. 2C illustrates yet another non-linear distance-mapping curve that may be used in applications consistent with the present invention. As illustrated, the amount of parallax offset applied to an object in a scene will be zero at convergence point 12 and will increase until a certain threshold distance 32. Beyond the threshold distance, the amount of applied parallax offset may remain constant. Rather than increasing linearly between convergence point 12 and threshold distance 32, however, the distance-mapping curve of FIG. 2C may follow the path of any predetermined non-linear function (e.g., a hyperbolic tangent function). Implementation of the distance-mapping curves shown in any of FIGS. 2A-2C may be performed on a per-object basis in real time using, for example, computer hardware-based 3D accelerators that support "vertex programs" or "vertex shaders." The vertex shader may be used, for example, to compute one or more distance-mapping curves.

Figure 3:
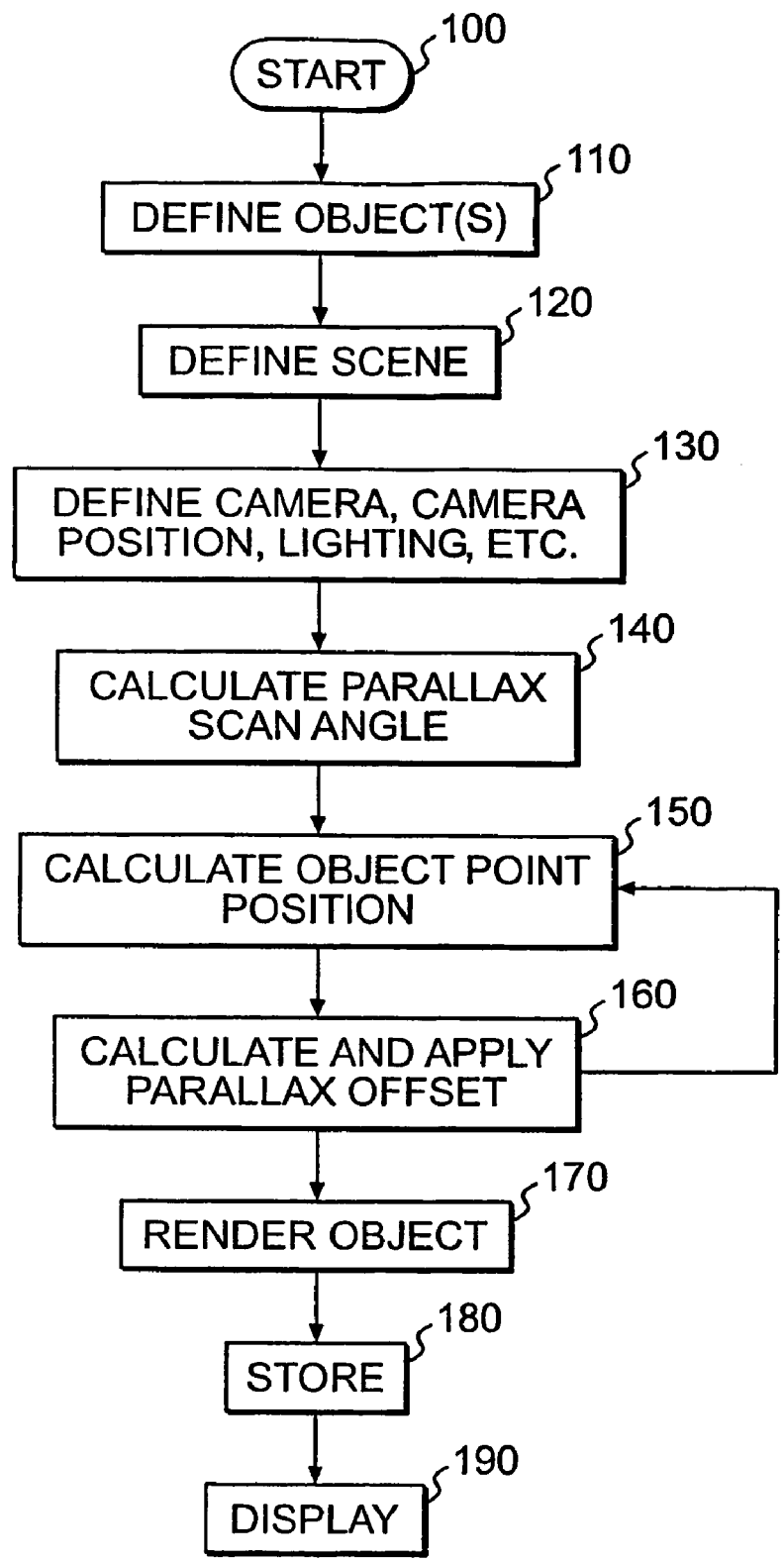
FIG. 3 provides a schematic illustration representative of a method performed by an exemplary embodiment of the invention.

A method consistent with the present invention may proceed as set forth in FIG. 3. The process illustrated in FIG. 3 may be performed on a frame basis, meaning that the process may be implemented for each new frame to be generated and displayed by a 3D graphics application. Further, the process of the present invention may be performed selectively such that any portion of the frames generated by the 3D graphics application may include parallax offset information.

To maximize the impact to a computer simulation (e.g., a 3D computer game), a computer may monitor scene information and may automatically determine appropriate parallax scanning parameters based on the scene information. Input or user feedback may or may not be used in the computer's decision making process. Specifically, an automatic scan control algorithm may collect and use information about the scene being recorded to determine the optimal settings for parameters such as the parallax angle and convergence distance. Appropriate scene information that can be used to determine the parallax scan settings include, for example, observer motion speed, distance to various objects in the scene, the field-of-view (FOV) angle, and the screen size of the display. Once the optimal parallax scan settings have been determined, they may be implemented in the next frame or set of frames generated by the computer. In this manner, the 3D effect of parallax scanning may be tailored to each scene according to the properties of the scene.

In step 100, the method of computer generating an image frame begins. In step 110, an object and object motion are defined in three-dimensional space, and in step 120, a scene to include the object is also defined in three-dimensional space. The imaging device or camera, camera position (points of view), illumination, range, etc., are defined in step 130. Camera definitions may include simulations of an imaging plane, lens parameters (e.g., size and shape), and lens aperture parameters (e.g., size and shape). Prior to generating each frame, a parallax scan angle is calculated by the computer at step 140 based on scene information and on the previous parallax scan angle. At step 150, an object point location is calculated (e.g., the position of a point, or vertex, on a polygon used to represent a portion of a scene object). At step 160, the parallax offset is calculated and applied to the point location calculated in step 150. Steps 150 and 160 may be repeated for each point in each object in a scene. Once the points have been calculated and offsets have been applied, the objects are rendered at step 170. The rendered images may be stored in computer memory on a frame-by-frame basis in step 180. The stored images can then be retrieved from memory for display on a computer monitor, recorded on video tape for display on a TV screen and/or recorded on film for projection on a screen (step 190).

In one exemplary embodiment, various software routines including a vertex shader may be used to accomplish one or more of the steps set forth in FIG. 3. For example, an object position calculating software routine may calculate the parallax scan parameters, and the same or another software routine may perform trigonometric calculations for locating the points in a scene. Instead of rendering the scene based only on this information, however, the vertex shader may be selected and loaded with the calculated parallax scan and object position parameters. For each point in the scene, the vertex shader may be called to offset the calculated object positions by appropriate amounts based on the calculated parallax scan parameters. The vertex shader may also be used to apply any desired distance-mapping curves to the calculated object positions during this process.

The vertex shader can modify the positions of objects in the scene on-the-fly. Scene objects, for example, may be moved in a plane that is perpendicular to the optical axis while holding the camera fixed. The amount of movement may be based on the distance of the object's plane to the convergence plane as measured along the optical axis. The vertex shader approach improves stability and presents a clearly defined convergence plane. This behavior is much closer to the behavior of the MOE lens optics when parallax scanning.

The invention claimed is:

1. A method of generating virtual autostereoscopic images using a computer, comprising:
creating, in a virtual three-dimensional software space, a scene to be imaged by defining at least one object in the virtual space, wherein the at least one object includes a computer-generated image;
defining a virtual point of view, associated with the virtual space;
generating images by simulating, in the virtual three-dimensional space, a parallax scanning motion of the at least one object with respect to a fixed virtual point of view;
offsetting, with a vertex shader, a position of the at least one object;
storing the generated images; and
displaying the generated images.

2. A method of generating virtual autostereoscopic images using a computer, comprising:
creating, in a virtual three-dimensional software space, a scene to be imaged by defining at least one object in the virtual space, wherein the at least one object includes a computer-generated image;
defining a virtual point of view, associated with the virtual space;
generating images by simulating a parallax scanning motion of the at least one object by applying a parallax offset to a position of the at least one object, wherein the parallax offset varies with respect to a distance between the at least one object and a convergence plane, and further wherein the parallax offset is zero at the convergence plane and has a maximum value at a predetermined threshold distance value;
storing the generated images; and
displaying the generated images.

3. The method of claim 2, wherein the parallax offset varies linearly between the convergence plane and the threshold distance value.

4. The method of claim 2, wherein the parallax offset varies according to a nonlinear function between the convergence plane and the threshold distance value.

5. The method of claim 2, wherein the generating step further includes using a vertex shader to offset a position of the at least one object.

6. The method of claim 2, further including maintaining the virtual point of view at a fixed location.

7. A method of generating an image, comprising:
creating, in a virtual three-dimensional software environment, a scene to be imaged;
automatically monitoring at least one scene parameter associated with the scene to be imaged, the scene parameter including a distance between an observer and an object in the scene;
determining a parallax scanning parameter based on the at least one scene parameter;
applying the parallax scanning parameter to at least one object in the scene with respect to a fixed virtual point of view associated with the scene;
generating an image including the at least one object; and
displaying the generated image on a display.

8. The method of claim 7, wherein the parallax scanning parameter includes at least one of a parallax angle and a convergence distance.

9. The method of claim 7, wherein the scene parameter includes an observer motion speed.

10. The method of claim 7, wherein the scene parameter includes a distance between an observer and an object in the scene.

11. A computer readable memory storing machine readable code, the machine readable code containing instructions for a computer to perform a method comprising:
creating, in a virtual three-dimensional software space, a scene to be imaged by defining at least one object in the virtual space, wherein the at least one object includes a computer-generated image;
defining a virtual point of view, associated with the virtual space;
generating images by simulating, in the virtual three-dimensional space, a parallax scanning motion of the at least one object;
storing the generated images; and
displaying the generated images;
wherein the parallax scanning motion is simulated by applying a parallax offset to a position of the at least one object, wherein the parallax offset is zero at a convergence plane and has a maximum value at a predetermined threshold distance value.

12. The computer readable memory of claim 11, wherein the machine readable code contains instructions for the computer to maintain the virtual point of view at a fixed location.

13. A computer based imaging system, comprising:
a computer readable memory storing machine readable code containing instructions for creating, in a virtual three-dimensional software space, a scene to be imaged by defining at least one object in the virtual space, wherein the at least one object includes a computer-generated image, defining a virtual point of view, associated with the virtual space, and generating images by simulating a parallax scanning motion of the at least one object;
a processor that executes the instructions stored on the computer readable memory;
a data storage location that stores one or more of the generated images; and
a display that displays the generated images;

wherein the parallax scanning motion is simulated by applying a parallax offset to a position of the at least one object, wherein the parallax offset is zero at a convergence plane and has a maximum value at a predetermined threshold distance value.

14. The computer based imaging system of claim 13, wherein the computer readable memory includes instructions for maintaining the virtual point of view at a fixed location.

15. A method of generating virtual autostereoscopic images using a computer, comprising:
   defining at least one object in a virtual three-dimensional space;
   defining a virtual point of view, associated with the virtual space;
   generating images by simulating a parallax scanning motion of the at least one object by applying a parallax offset to a position of the at least one object, wherein the parallax offset is zero at a convergence plane and has a maximum value at a predetermined threshold distance value;
   storing the generated images; and
   displaying the generated images.

16. The method of claim 15, wherein the parallax offset varies linearly between the convergence plane and the threshold distance value.

17. The method of claim 15, wherein the parallax offset varies according to a nonlinear function between the convergence plane and the threshold distance value.

18. The method of claim 15, wherein the generating step further includes using a vertex shader to offset a position of the at least one object.

19. The method of claim 15, further including maintaining the virtual point of view at a fixed location.

20. The method of claim 1, wherein the parallax offset varies linearly between a convergence plane and the threshold distance value.

21. The method of claim 1, wherein the parallax offset varies according to a nonlinear function between a convergence plane and the threshold distance value.

22. The method of claim 1, wherein the fixed point of view includes a first point of view associated with a first frame or a first set of frames and a second point of view associated with a second frame or a second set of frames.

23. The method of claim 7, wherein the fixed point of view includes a first point of view associated with a first frame or a first set of frames and a second point of view associated with a second frame or a second set of frames.

24. A method of generating virtual autostereoscopic images using a computer, comprising:
   creating, in a virtual three-dimensional software space, a scene to be imaged by defining at least one object in the virtual space, wherein the at least one object includes a computer-generated image;
   defining a virtual point of view, associated with the virtual space;
   generating images by simulating, in the virtual three-dimensional space, a parallax scanning motion of the at least one object at a first virtual point of view, wherein the first virtual point of view is fixed for at least one of a first frame and a first set of frames;
   storing the generated images; and
   displaying the generated images.

25. The method of claim 24, wherein generating images includes simulating, in a virtual three-dimensional space, a parallax scanning motion of the at least one object at a second virtual point of view, wherein the second virtual point of view is fixed for at least one of a first frame and a first set of frames.

26. The method of claim 24, wherein the generating step further includes applying a parallax offset to a position of the at least one object.

27. The method of claim 26, wherein the parallax offset varies with respect to a distance between the at least one object and a convergence plane.

28. The method of claim 27, wherein the parallax offset is zero at the convergence plane and has a maximum value at a predetermined threshold distance value.

29. The method of claim 28, wherein the parallax offset varies linearly between the convergence plane and the threshold distance value.

30. The method of claim 26, wherein the parallax offset varies according to a nonlinear function between the convergence plane and the threshold distance value.

* * * * *

UNITED STATES PATENT AND TRADEMARK OFFICE
CERTIFICATE OF CORRECTION

PATENT NO. : 7,463,257 B2
APPLICATION NO. : 10/536447
DATED : December 9, 2008
INVENTOR(S) : Michael Burgess Martin It is certified that error appears in the above-identified patent and that said Letters Patent is hereby corrected as shown below:

On the Title page:

Item 57, Abstract, Line 1, "and method" should read -- a method --.

Item 57, Abstract, Line 6, "and be" should read -- can be --.

Signed and Sealed this

Twenty-fourth Day of March, 2009

JOHN DOLL
*Acting Director of the United States Patent and Trademark Office*